United States Patent
Stenlake, Jr.

[11] Patent Number: 6,151,902
[45] Date of Patent: Nov. 28, 2000

[54] COMPOSITION FOR INDUCING THE CREATION OF ARTIFICIAL SNOW AND METHOD OF USE

[76] Inventor: Charles F. Stenlake, Jr., R.D. 1 Box 1165, McCormick Rd., Chateaugay, N.Y. 12920

[21] Appl. No.: 09/136,337

[22] Filed: Oct. 19, 1998

Related U.S. Application Data

[60] Provisional application No. 60/057,851, Sep. 2, 1997.

[51] Int. Cl.[7] ........................................................ F25C 3/04
[52] U.S. Cl. .................................................. 62/69; 252/67
[58] Field of Search ................................ 62/69, 70, 304, 62/347; 252/67

[56] References Cited

U.S. PATENT DOCUMENTS

| | | | |
|---|---|---|---|
| 3,596,476 | 8/1971 | Jakob et al. ............................... | 62/347 |
| 4,793,142 | 12/1988 | Bucceri ...................................... | 62/347 |
| 4,953,360 | 9/1990 | Rzechula .................................... | 62/235 |

*Primary Examiner*—William E. Tapolcai
*Attorney, Agent, or Firm*—Lilling & Lilling

[57] ABSTRACT

The present invention is directed to a method for making artificial snow wherein a snow-inducing agent is injected into the water of a snow-making system along with a particulate for increased snow-making capabilities and a higher quality of snow The snow-inducing agent is a compound being a sulfate with a $C_{8-16}$ carbon chain alcohol. Preferably, the compound is sodium myreth sulfate. The snow-inducing agent places tiny micro millimeter size air "bubbles" within the water molecules thereby stretching the molecules. The particles then mix in the wall of the water molecules causing the droplet to be hollow. The thin outer wall containing the particulate acts as a nucleating agent to start the freezing process. The molecule is less dense causing a faster transfer of latent heat combined with sensible heat.

9 Claims, 1 Drawing Sheet

COMPOSITION FOR INDUCING THE CREATION OF ARTIFICIAL SNOW AND METHOD OF USE

This application claims benefit to U.S. provisional application Ser. No. 60/057,851 filed Sep. 2, 1997.

FIELD OF THE INVENTION

This invention relates to a method for making artificial snow.

BACKGROUND OF THE INVENTION

The basic objective of snow making is to atomize the water into droplets, blow the droplets up into the air and allow them to substantially freeze before they contact the ground. Methods and equipment for making artificial snow are well known. Most snow-making methods rely upon the nucleation of at least a portion of the water spray to initiate the freezing process. That is, a process by which crystals are formed from liquids. A nucleator is simply a foreign particle that pollutes the water. Crystals originate on a minute trace of foreign substance, which in turn acts as a nucleus. An ice nucleator is added into the snow making water supply to act as a seed for the formation of snow-like crystals. Ice nuclei are formed, about which additional water will crystallize upon introduction into sufficiently cold air temperatures to form artificial snow. Typically, the air temperature should be no more than 15–25° F. and preferably are lower.

The use of nucleating agents to produce artificial snow is well known. Prior art compounds include the use of bacteria, silica, and other agents. However, it has found that these materials have a number of disadvantages. They are not very efficient. They require high amounts of compressed air. The snow produced is not of a high quality. Agents which employ bacteria breakdown after a short period of time and lose their efficiency making it difficult to store large amounts which may be needed at short notice. These materials will also be susceptible to producing a strong odor as they decompose over several days. In addition many agents accelerate wear on snow making machines due to their granular nature. Further, many of the prior art agents must be frozen when transported and stored.

SUMMARY OF INVENTION

The present invention provides a novel snow-inducing agent which overcomes these disadvantages and provides an agent which is more efficient than prior art compounds, produces higher quantities of snow having a higher quality, does not lose its efficiency over time, and which requires less compressed air in the snow-making process.

According to the present invention then, there is provided the use of a snow-inducing composition for the production of artificial snow comprising a compound having a $C_{8-16}$ carbon chain.

Preferably, the snow-inducing agent is sodium myreth sulfate also known as sodium myristyl ether sulfate.

In addition, the present invention includes a method wherein the snow inducing composition may be injected into a low pressure line connecting a snow making apparatus to a water source thereby increasing agitation of the composition while in the snow making apparatus resulting is a better aqueous mixture of the water source and the snow inducing composition. As a result, artificial snow of higher quality may be produced using a lesser amount of inducer than in prior art devices The present invention further comprises the use of a particulate. Preferably, the particulate is lactose or micro crystalline cellulose.

DETAILED DESCRIPTION

Figure 1:
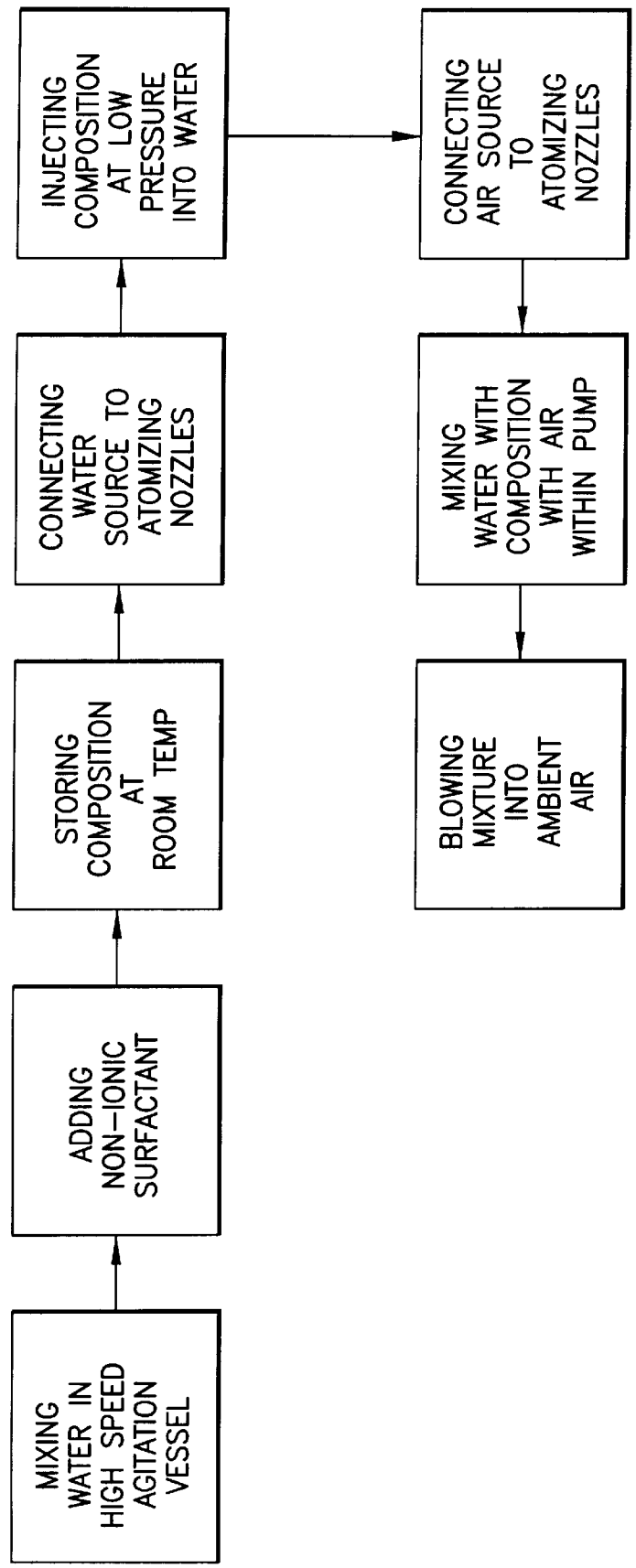
FIG. 1 is a flow chart showing the steps of the method of this invention.

The present invention comprises the use of a compound having a $C_{8-16}$ carbon chain as a snow-inducing agent in the production of artificial snow. Preferably, the compound is a sulfate having a $C_{8-16}$ carbon chain alcohol. Preferably, the compound used is sodium myreth sulfate also known as sodium myristyl ether sulfate. The compound is a by product of petroleum having high foaming capabilities creating bubbles in water and aiding in the freezing and formation of snow-like crystals.

The snow inducing composition is produced by:
  (a) mixing water in a high speed agitation vessel at room temperature,
  (b) adding a non-ionic surfactant to said water, whereby the resulting aqueous solution contains 30%–70% of said non-ionic surfactant.

Preferably the non-ionic surfactant is a sulfate compound having a $C_{8-16}$ carbon chain alcohol, however any non-ionic surfactant may be used. In the preferred embodiment, the sulfate compound is sodium myreth sulfate, also known as sodium myristyl ether sulfate and mixed in an equal parts of 1:1 ratio with water. The aqueous mixture is mixed at room temperature for at least two hours, then stored at a temp above 32° F./0° C. due to the fact that the mixture will separate at cooler temperatures.

In the present invention, the snow inducing composition is not a conventional nucleating agent but, instead, increases the freezing capabilities of water. To change water from liquid to solid, one must remove 144 BTU's per pound of water. This heat is called latent heat. Latent means to change the state of something. Conventional inducers found in the prior art do not accomplish this function. All that they do is determine at what point this will take place and not how long it takes to transfer latent heat. The sulfate compound in the present invention, places tiny micro millimeter size air "bubbles" within the water molecules thereby "stretching" the water droplets. In this way, the density of a water droplet is reduced, and as a consequence, it can be cooled much faster. As can be seen from the microscope photographs, the additional particles then mix in the wall of the water molecules causing the droplets to be hollow. The thin outer wall containing the particles acts as a nucleating agent to start the freezing process. The molecule is less dense thus causing a faster transfer of latent heat combined with sensible heat. For this reason, the present invention works with any water quality, at any temperature, and much better than the prior art.

Snow-making equipment includes an artificial snow making apparatus containing a large pump connected to a water source. A small injection pump connected to storage vessel containing the present invention, is in turn coupled to a line uniting the water source to the larger snow producing pump. The larger pump draws the water mixed with the snow inducing composition through the artificial snow making apparatus and then to the atomizing nozzles on the ski slope where the artificial snow is needed. Water enters the larger pump at low pressure from a storage area and is pumped under high pressure to the specified area on the ski slope. In the present invention, the snow inducing composition is added to the water at the low pressure side of the pump using a small injection pump to draw a metered amount of 6 ml.–20 ml. per minute of the composition into the low pressure line. The suction and impeller force of the larger pump creates an increased mixing effect of the mixture and the water. With improved mixing, greater efficiency is achieved. As well, by adding the snow inducing compound at the low pressure side of the pump, the need for expensive high pressure injection equipment is eliminated further reducing the cost of producing artificial snow. In contrast, in prior art devices, the nucleating agent is added at the high pressure side of the pump by high pressure injection equipment and is less efficient than the present invention. Further, in prior art devices, the nucleating agent is generally abrasive. It is therefore added at the high pressure side of the pump to eliminate wear on the pump and/or pump failure caused by an abrasive agent passing through the innards of the pump. The mixture of the present invention is not abrasive and therefore can be passed through the pump without causing any damage or undue wear.

The present invention also includes the use of a particulate. Depending on the degree of hardness of the water source, a particulate may be added separately to the composition to act as an additional nucleating agent. Hard water is formed where water contains low percentages of calcium and magnesium carbonates, bicarbonates, sulfates, or chlorides, as a result of long contact with rocky substrates and soils. Degree of hardness is expressed either as grains per gallon or parts per million of calcium carbonate (1 grain of $CaCO_3$ per gallon is equivalent to 17.1 parts per million). Up to 5 grains is considered soft, over 30 grains is very hard.

Hard water contains natural nucleators, however where the water is soft then a particulate is added to serve as a nucleating agent. Where the water contains under 20 grains of hardness at least 50 grams of particulate is added per million gallons of water induced into the artificial snow making apparatus. In the preferred embodiment, 300 grams per 1 million gallons of water induced is used. The particulate is mixed separately with the snow inducing composition at the location where snow is to be made and prior to induction into the low pressure line of the snow gun. In the preferred embodiment, the particulate is lactose or micro crystalline cellulose, however any sugar, carbohydrate, protein, fat or fungi may be used. These particulates enhance the freezing process due to their increased surface area and jagged edges. For best results, a particulate having a diameter of 0.01–6.0 microns is preferred. In addition, neither lactose nor micro crystalline cellulose resulted in abrasive wear or clogging of the artificial snow making apparatus.

The use of the present invention in producing artificial snow provides for a higher snow production per volume of water and compressed air than prior art devices. To produce snow, the present invention has been found to require approximately 16% less compressed air, allow for 35% more water, and produce 90% more snow. This results in substantial monetary savings. Normally, the cost of compressing air accounts for 60%–70% of the cost of producing artificial snow. It is considerably less expensive to pump water than to produce and pump compressed air. The present invention has the ability to reduce the surface tension of water. This reduced surface tension has an effect on reduced air consumption because it takes less cubic feet per minute to atomize the water. In this way the normal air to water ratio of 3:1 is reduced to approximately 1:1. Since it requires a lower amount of compressed air and a greater amount of water, the use of the-present invention significantly reduces the overall cost of producing artificial snow.

The present invention also produces a better qualify of artificial snow which is more completely frozen, and lasts longer than artificial snow produced by the prior art devices. Field tests and observations of snow artificially produced using the snow inducing composition reveal artificial snow which when groomed out has a superior "powder effect" upon comparison to snow produced using other prior art inducers. The prior art produces artificial snow which is wet, chunky and does not leave the best skiing surface. Consequently, artificial snow produced with the present invention was deemed to display a "velvet" like appearance and groom out more like natural powder. Furthermore, due to surfaced tension reduction in artificial snow produced by the present invention, moisture can be leached through the hard packed snow quickly. The result is a drier skiing surface. Keeping the surface drier will in effect produce a longer lasting product. In addition the leaching effect will prevent undesired icing to occur. Ice is a persistent problem for all ski areas that produce artificial snow. Ice develops when due to high midday temperature or rain, excessive moisture builds upon the skiing surface. Where the moisture is unable to drain, the snow surface becomes slushy. As night falls and/or the temperature drops, the surface quickly freezes creating a top layer of ice. The reduction in surface tension allows this excess surface moisture to leach through the snow rather then remain on the snow surface. In this way icing is avoided.

In addition, the snow inducing composition is an environmentally friendly completely biodegradable and non-toxic product posing no threat to the environment, ski hill workers or skiers. Environmental impact studies were conducted on the snow inducing composition and artificial snow produced using the composition. The study applied methylene blue analysis and river water die-way method to test the overall biodegradation of the present invention. Biodegradation is defined as the destruction of chemical compounds by the biological action of living organisms in nature. Using this test, the composition was found to be 100% biodegrade over a time period of 10 days.

The ingredients comprising the present invention are readily used by most bacteria as food sources allowing for the quick and total breakdown of the invention. The makes the present invention totally biodegradable in a very short amount of time. The rapid biodegradation is a result of the snow inducing composition's simple organization and structure. This overall process is oxidation, and it is largely by such means that dead organic matter is broken down in nature to simpler components to be once again available for use by the living bacteria.

According to Federal, and some Local Departments of Environmental Conservation, the present invention is significantly below maximum allowable concentrations by 40% or more when properly used. According to ground water effluent standards for the United States, when properly used, the present invention may be directly injected into ground water supplies.

The present invention may be used at a range of temperatures to produce snow at a 0–1 wet bulb. A wet bulb is a measure of the point at which water freezes taking into account the average temperature, altitude and relative humidity. The following chart displays a dry bulb to wet bulb conversion table based on dry bulb temperature and relative humidity. The resulting wet bulb is the actual point at which water will freeze based on the relative humidity and dry bulb temperature. For example, under a dry bulb temperature of 20° F. at 40% relative humidity, the resulting wet bulb temperature is 15.5° F.

| DRY BULB TO WET BULB CONVERSION TABLE | | | | | | | | | | | | | |
|---|---|---|---|---|---|---|---|---|---|---|---|---|---|
| DB 38.0 | DB 36.0 | DB 34.0 | DB 32.0 | DB 30.0 | DB 28.0 | DB 26.0 | DB 24.0 | DB 22.0 | DB 20.0 | DB 18.0 | DB 16.0 | DB 14.0 | DB 12.0 |
| RH WB | WB | WB | WB | WB | WB | WB | WB | WB | WB | WB | WB | WB | WB |
| 100% 38.0 | 36.0 | 34.0 | 32.0 | 30.0 | 28.0 | 26.0 | 24.0 | 22.0 | 20.0 | 18.0 | 16.0 | 14.0 | 12.0 |
| 90% 36.9 | 35.0 | 33.0 | 31.0 | 29.1 | 27.2 | 25.0 | 23.2 | 21.3 | 19.4 | 17.3 | 15.3 | 13.5 | 11.5 |
| 80% 35.8 | 33.9 | 32.0 | 30.0 | 28.1 | 26.1 | 24.2 | 22.4 | 20.5 | 18.6 | 16.8 | 14.9 | 12.9 | 11.0 |
| 70% 34.5 | 32.5 | 30.9 | 28.9 | 27.2 | 25.0 | 23.1 | 21.5 | 19.8 | 18.0 | 16.0 | 14.2 | 12.2 | 10.4 |
| 60% 33.0 | 31.1 | 29.4 | 27.8 | 26.0 | 24.2 | 22.4 | 20.8 | 19.0 | 17.2 | 15.4 | 13.5 | 11.8 | 9.9 |
| 50% 31.5 | 30.0 | 28.2 | 26.6 | 25.0 | 23.1 | 21.5 | 19.9 | 18.1 | 16.3 | 14.6 | 13.0 | 11.0 | 9.2 |
| 40% 30.1 | 28.5 | 27.0 | 25.4 | 23.9 | 22.2 | 20.6 | 19.0 | 17.3 | 15.6 | 13.9 | 12.2 | 10.4 | 8.8 |
| 30% 28.8 | 27.2 | 25.8 | 24.2 | 22.8 | 21.2 | 19.6 | 18.2 | 16.5 | 14.0 | 13.2 | 11.6 | 9.9 | 8.2 |
| 20% 27.2 | 26.0 | 24.5 | 23.0 | 21.6 | 20.1 | 18.6 | 17.2 | 15.6 | 14.0 | 12.5 | 10.9 | 9.2 | 7.5 |
| 10% 26.0 | 24.5 | 23.2 | 22.0 | 20.5 | 19.0 | 17.6 | 16.2 | 14.8 | 13.2 | 11.8 | 10.1 | 8.5 | 7.0 |
| 0% 24.5 | 23.0 | 22.0 | 20.8 | 19.5 | 18.0 | 16.7 | 15.3 | 13.9 | 12.5 | 11.0 | 9.6 | 8.0 | 6.5 |

DB = Dry Bulb Temperature (° F.)
WB = Wet Bulb Temperature (° F.)
RH = Relative Humidity Field observations reveal that utilization of the present invention at wet bulb temperatures in the 25° F. to 10° F. range increased flow rates as much as 30 % while making the same quality of snow. The flow rate is defined as the gallons per minute (GPM) of water used to produce artificial snow. Therefore, an increase in the flow rate, will in turn produce a greater amount of artificial snow on the mountain. This flow rate is increased using the same or less cubic feet per minute of compressed air, thereby reducing the cost of production. Prior art compounds are not efficient or do not work at temperatures below 15–25° F. or at a wide range of temperatures.

EXPERIMENT 1

The present invention has been tested against prior art products and the following results were obtained.

| PRODUCT | LIFT |
|---|---|
| plain water - control solution | control |
| SnoMax ™ - three day old solution | 10% |
| SnoMax ™ - fresh mixture | 20% |
| Avalanche ™ | 40% |
| Avalanche ™ and lactose | 50% |
| Avalanche ™ and cellulose (derived from wood chips) | 50% |
| Super Snow ™ | 0% |
| Avalanche ™ and silica | 40% |

Amounts of artificial snow were produced using each of the above products as ice nucleating agents. Plain water was used as a control and each of the artificial snows were compared to that produced using plain water. Approximate averages of the test results are provided. Comparisons were made on the basis of the lift. Lift is a measure of weight of the artificial snow. Artificial snow weighs less than frozen water. Therefore, a higher lift percentage indicates that more frozen product, i.e. artificial snow, and less water was produced during the testing procedures.

SnoMax™ is an ice nucleating agent made from Pseudomonas bacteria. The three day old SnoMax™ mixture produced a 10% lift as compared to natural water. It produced a −1 wet bulb measured at 32° C. and 60% humidity. In contrast the fresh SnoMax™ produced a 20% lift. One of the disadvantages of this mixture is the deterioration of the mixture over time resulting in lower efficiency. This factor allows only small amounts of SnoMax™ to be stored over time. A further disadvantage is that as the bacterial nucleating agent deteriorates, an undesirable odor is produced.

Surprisingly, the snow inducing composition of the present invention (Avalanche™) provided a significantly improved lift over the prior art compounds. It produced artificial snow with a 40% lift, significantly better than either plain water or the SnoMax™ product. A mixture of Avalanche™ and lactose produced a 50% lift. The mixture of the composition of the present invention and cellulose produced a 50% lift, however, other disadvantages resulted reducing the overall efficiency. For example, the cellulose mixture tended to block the injection equipment requiring long periods of down time and increased man hours cleaning the equipment and nozzles. Subsequently testing revealed that use of a micro crystalline cellulose did not clog equipment and produced beneficial results equal to or better than that of lactose.

Supersno is a silica based product. The Supersno product produced no noticeable lift when compared to plain water. As expected, the mixture of the compound of the present invention and silica produced 40% lift, the same amount of lift as when the present invention was used alone without silica. Therefore, the presence of the silica did not affect the artificial snow being produced.

A further advantage of the present invention is that the same lift was achieved throughout temperature ranges. It produced the same or nearly the same lift when used in a broad range of temperatures ranging both above and below 0° C./32° F. This advantage is not present in the prior art solutions. SnoMax™, in particular, is only efficient at temperatures near or under 27° F. and therefore is restricted in its use.

EXPERIMENT 2

The present invention was tested against prior art devices under similar outdoor weather conditions and a comparison of performance was produced based on overall production of artificial snow.

AVALANCHE TEST RESULTS 1997/1998 SEASON

| | Wet Bulb | Air Press | Air Temp | Water Press | Water Temp. Flow | GPM Prod. | |
|---|---|---|---|---|---|---|---|
| | 19 | 90 | 44 | 849 | 40 | 998 | SnoMax |
| | 17 | 88 | 45 | 846 | 41 | 1044 | SnoMax |
| | 16 | 88 | 47 | 845 | 41 | 1045 | SnoMax |
| | 15.5 | 86 | 48 | 845 | 41 | 1122 | SnoMax |
| | 14.5 | 89 | 50 | 845 | 41 | 1197 | SnoMax |
| | 13.7 | 86 | 47 | 847 | 41 | 1216 | SnoMax |
| | 12.7 | 86 | 49 | 845 | 41 | 1247 | SnoMax |
| Aver. | 15.485714 | 86.571429 | 47.142857 | | 40.857143 | 1124.1429 | |
| | 18 | 86 | 41 | 797 | 48 | 851 | Super Sno |
| | 16.8 | 86 | 40 | 458 | 40 | 1010 | Super Sno |
| | 15 | 80 | 40 | 458 | 40 | 1097 | Super Sno |
| | 14 | 82 | 39 | 455 | 40 | 1111 | Super Sno |
| | 12 | 84 | 56 | 795 | 40 | 1180 | Super Sno |
| | 11 | 88 | 43 | 797 | 41 | 1360 | Super Sno |
| | 17.7 | 84 | 46 | 795 | 41 | 1373 | Super Sno |
| Aver. | 14.928571 | 84.285714 | 43.571429 | 650.71429 | 41.428571 | 1140.2857 | |
| | 12 | 91 | 45 | 477 | 40 | 1911 | Avalanche |
| | 12 | 91 | 45 | 475 | 40 | 1754 | Avalanche |
| | 13 | 88 | 46 | 475 | 40 | 1795 | Avalanche |
| | 14 | 86 | 46 | 475 | 40 | 1732 | Avalanche |
| | 15 | 89 | 42 | 475 | 40 | 1766 | Avalanche |
| | 17 | 90 | 46 | 475 | 40 | 1765 | Avalanche |
| | 20.4 | 86 | 40 | 475 | 40 | 1550 | Avalanche |
| Aver. | 14.771429 | 88.714286 | 44.285714 | 474.85714 | | 1753.2857 | |

| WET BULB | FLOW |
|---|---|
| SnoMax | SnoMax |
| 15.485714 | 1124.1429 |
| Super Sno | SuperSno |
| 14.928571 | 1140.2857 |
| Avalanche | Avalanche |
| 14.771429 | 1753.2857 |

0.6503707 times better than SnoMax
0.6411635 times better than Super Sno

Various amounts of artificial snow were produced using each of the above products as ice nucleating agents. Approximate averages of the test results are provided. Comparisons were made using similar wet bulb, air pressure, air temperature, water pressure and water temperature flow for nucleating agents of the prior art and the present invention. In addition, the tests were carried out using the same number of snow guns online with the main snow making apparatus in order to further equalize the comparison.

As can be seen from the test results, comparison of the flow rate/gallons per minute (GPM) of water shows superior performance by the present invention. The average GPM for SnoMax and SuperSno was 1124.14 and 1140.29 respectively. In contrast, Avalanche yielded a substantially higher average GPM of 1753.29, which is approximately 65% greater then either SnoMax or SuperSno. Thus under like conditions, the present invention was able to produce a greater volume of artificial snow at a reduced cost as compared to the prior art.

The above-described embodiments of the present invention are meant to be illustrative of preferred embodiments of the present invention and are not intended to limit the scope of the present invention. The only limitations to the scope of the present invention are set out in the following appended claims.

I claim:

1. A method of inducing the creation of artificial snow, comprising the steps of:
   1. producing a snow inducing composition by
      a. mixing water in a high speed agitation vessel at room temperature for at least two hours; and
      b. adding a non-ionic surfactant to said water whereby said snow inducing composition contains 30%–70% of said non-ionic surfactant, whereby tiny micromilimeter size air bubbles are created within molecules of said water;
   2. storing said snow inducing composition at a temperature above 32° F.;
   3. connecting a water source to atomizing nozzles distributed along the surface of a field on which the artificial snow will be created;
   4. pumping said water from said water source at low pressure to an input of a pump, and then pumping said water from an output of said pump to said atomizing nozzles at high pressure;
   5. injecting said snow inducing composition into said water at said input of said pump, whereby said snow inducing composition is mixed with said water;
   6. connecting an air source to said atomizing nozzles; and
   7. within said atomizing nozzles mixing said water with said snow inducing composition with said air and blowing said resulting mixture into the ambient air from said atomizing nozzles, whereby said resulting mixture freezes in the ambient air and forms artificial snow on the surface of said field.

2. The method of claim 1, wherein said non-ionic surfactant is a compound having a $C_{8-16}$ carbon chain.

3. The method of claim 1, wherein said non-ionic surfactant is a sulfate having a $C_{8-16}$ carbon chain alcohol.

4. The method of claim 1, wherein said non-ionic surfactant is sodium myreth sulfate.

5. The method of claim 1, wherein said snow inducing compound is injected into said water at said input of said pump at a metered amount of 6 ml–20 ml per minute.

6. The method of claim 1, further comprising adding a particulate to said snow inducing compound as a nucleating agent.

7. The method of claim 6, wherein the particulate is lactose.

8. The method of claim 6, wherein the particulate is microcrystalline cellulose.

9. The method of claim 6, wherein the particulate has a diameter of 0.01–6.0 microns.

* * * * *